United States Patent
Chang et al.

(10) Patent No.: US 7,593,598 B2
(45) Date of Patent: Sep. 22, 2009

(54) SYSTEM AND METHOD FOR EFFICIENT FILTER DESIGN THROUGH WEIGHTED DIFFERENCE OF GAUSSIAN FILTERS

(75) Inventors: Ti-chiun Chang, Plainsboro, NJ (US); Jason Jenn-Kwei Tyan, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 816 days.

(21) Appl. No.: 11/344,480

(22) Filed: Jan. 31, 2006

(65) Prior Publication Data

US 2006/0170980 A1 Aug. 3, 2006

Related U.S. Application Data

(60) Provisional application No. 60/649,412, filed on Feb. 2, 2005.

(51) Int. Cl.
*G06K 9/40* (2006.01)

(52) U.S. Cl. .................. 382/279; 382/260; 382/261; 382/266; 382/254; 382/256; 358/1.9; 358/3.27; 358/1.2; 348/606; 348/610; 348/624; 359/885; 359/892

(58) Field of Classification Search .............. 382/297, 382/209, 232, 237, 251, 252, 260, 261, 299; 358/3.27, 443, 3.08, 298

See application file for complete search history.

(56) References Cited

U.S. PATENT DOCUMENTS

| | | | |
|---|---|---|---|
| 6,381,372 B1 * | 4/2002 | Loce | 382/261 |
| 2004/0081364 A1 * | 4/2004 | Murphy | 382/260 |
| 2004/0081370 A1 * | 4/2004 | Murphy | 382/286 |

FOREIGN PATENT DOCUMENTS

| | | | |
|---|---|---|---|
| EP | 1 411 470 | * | 9/2003 |
| EP | 1411469 A | | 4/2004 |
| EP | 1411470 A | | 4/2004 |

OTHER PUBLICATIONS

Algorithm for the computation of region based image edge profile acutance; 1995, rangayyan et al.*

* cited by examiner

*Primary Examiner*—Vikkram Bali
*Assistant Examiner*—Nancy Bitar
(74) *Attorney, Agent, or Firm*—Donald B. Paschburg; F. Chau & Associates, LLc

(57) ABSTRACT

A method of designing filters for filtering digitized images includes constructing a set of difference-of-Gaussian (DoG) filters that partition a frequency space, forming a linear combination of said DoG filters to form a trial filter, convolving said trial filter with a training image to obtain a trial image, summing a square difference of said trial image and a target image, wherein if said sum is a minimum, outputting said trial filter as a final filter, and using a singular value decomposition on said final filter wherein an eigenvector corresponding to the largest eigenvalue of the final filter is obtained.

18 Claims, 4 Drawing Sheets

SYSTEM AND METHOD FOR EFFICIENT FILTER DESIGN THROUGH WEIGHTED DIFFERENCE OF GAUSSIAN FILTERS

CROSS REFERENCE TO RELATED UNITED STATES APPLICATIONS

This application claims priority from "Efficient Filter Design Through Weighted Difference of Gaussian Filters", U.S. Provisional Application No. 60/649,412 of Chang, et al., filed Feb. 2, 2005, the contents of which are incorporated herein by reference.

TECHNICAL FIELD

This invention is directed filters for image enhancement of digital medical images.

DISCUSSION OF RELATED ART

Efficient and adjustable image enhancement can be used for preprocessing or postprocessing in many applications. In general, either efficiency or adjustability can be achieved, but it is not easy to achieve both goals simultaneously. Simple and flexible enhancement techniques are useful in controlling the visual appearance of an image. In practice, image enhancement can be accomplished by selectively emphasizing certain frequency bands in the Fourier space of the input image. There exist many ways to design filters to achieve desirable image enhancement. In a situation where a sequence of target images having varying enhancement levels is available, one can ask how to design efficient filters so that their filtered outputs are close to the given sequence of images. In addition, when these filters are applied to other images, the levels of enhancement should also be similar to those of the given image sequence. This question is different from the usual filter design approach which optimizes filter coefficients to best match the specification of the frequency response.

Filter design is an important topic in the signal processing literature. A popular approach for designing 2-D filters is to first design a 1-D filter and then transform it to the 2-D version. Another important technique is to directly specify the desirable 2-D frequency response and then optimize the spatial domain coefficients.

SUMMARY OF THE INVENTION

Exemplary embodiments of the invention as described herein generally include methods and systems for an efficient filter design technique based on a linear combination of several difference of Gaussian (DoG) filters. The weightings for this linear combination are optimized so that the designed separable filters can generate results which approximate those obtained by other algorithms of high computational complexity and certified by experts. Then, singular value decomposition (SVD) is employed to obtain the eigenvector that corresponds to the largest eigenvalue for the designed filter. This eigenvector is the separable filter achieving our objective.

According to an embodiment of the invention, a filter design procedure for matching one particular target image includes the following steps. DoG filters are designed whose major spectral supports are different from each other, but partition the frequency plane except for the direct current portion, to emphasize different frequency bands with predesigned weightings. Different new filters can be created by linearly combining, with different weighting combinations, the DoG filters designed in the previous step. The optimal weighting set is obtained by minimizing the square errors between the target image and the trial filtered outputs processed by the different new filters mentioned above. Given these optimized filter coefficients, which are stored as a matrix, singular value decomposition (SVD) can be used to find the eigenvector which corresponds to the largest eigenvalue of this matrix. This eigenvector is the desired separable filter.

According to an aspect of the invention, there is provided a method for designing filters for filtering digitized images, the method including providing a digitized training image $f(x)$ comprising a plurality of intensities corresponding to a domain of points on a n-dimensional grid, constructing a set of difference-of-Gaussian (DoG) filters $\{h_i(x)\}$ whose frequency responses partition a frequency space u, forming a linear combination of said DoG filters $h(x)=\Sigma c_i h_i(x)$, to form a trial filter, said trial filter being associated with a set of linear combination coefficients $\{c_i\}$ that weight the contribution of each DoG filter to the trial filter, convolving said trial filter with said training image to obtain a trial image $f_t(x)$, and summing a square difference $|f_t(x)-f_i(x)|^2$ of said trial image and a target image $f_i(x)$, wherein if said sum is a minimum, outputting said trial filter as a final filter.

According to a further aspect of the invention, if said sum is not a minimum, forming a new linear combination of said DoG filters, and repeating the steps of convolving said trial filter with said training image, and summing a square difference of said trial image and said training image.

According to a further aspect of the invention, the target image is obtained by ideally enhancing said training image.

According to a further aspect of the invention, ideally enhancing said training image comprises using a Laplacian pyramid.

According to a further aspect of the invention, the target image is another digitized image comprising a plurality of intensities corresponding to a domain of points on a n-dimensional grid.

According to a further aspect of the invention, the trial filter includes an allpass filter.

According to a further aspect of the invention, the training image is added to the convolution of said trial filter and said training image.

According to a further aspect of the invention, constructing a set of difference-of-Gaussian (DoG) filters comprises the steps of constructing a set $\{G_{\sigma_{4,i}}(x)\}$ of Gaussian filters of standard deviation $\sigma_i$ that are functions of frequency u, constructing an allpass filter $a(x)$, constructing a first DoG filter according to $h_1(x)=a(x)-G_{\sigma_{4,1}}(x)$, and constructing each subsequent DoG filter according to $h_i(x)=G_{\sigma_{4,i-1}}(x)-G_{\sigma_i}(x)$, until a predetermined number of DoG filters have been constructed.

According to a further aspect of the invention, the step of forming a linear combination of said DoG filters selecting a set of linear combination coefficients $\{c_i\}$ wherein each $c_i$ is limited to a predetermined range, quantizing said to obtain trial values for each $c_i$, and selecting a combination of coefficients to define said linear combination of filters.

According to a further aspect of the invention, the method comprises using a singular value decomposition on said final filter wherein an eigenvector corresponding to the largest eigenvalue of the final filter is obtained.

According to another aspect of the invention, there is provided a program storage device readable by a computer, tangibly embodying a program of instructions executable by the computer to perform the method steps for designing filters for filtering digitized images.

DETAILED DESCRIPTION OF THE PREFERRED EMBODIMENTS

Figure 1:
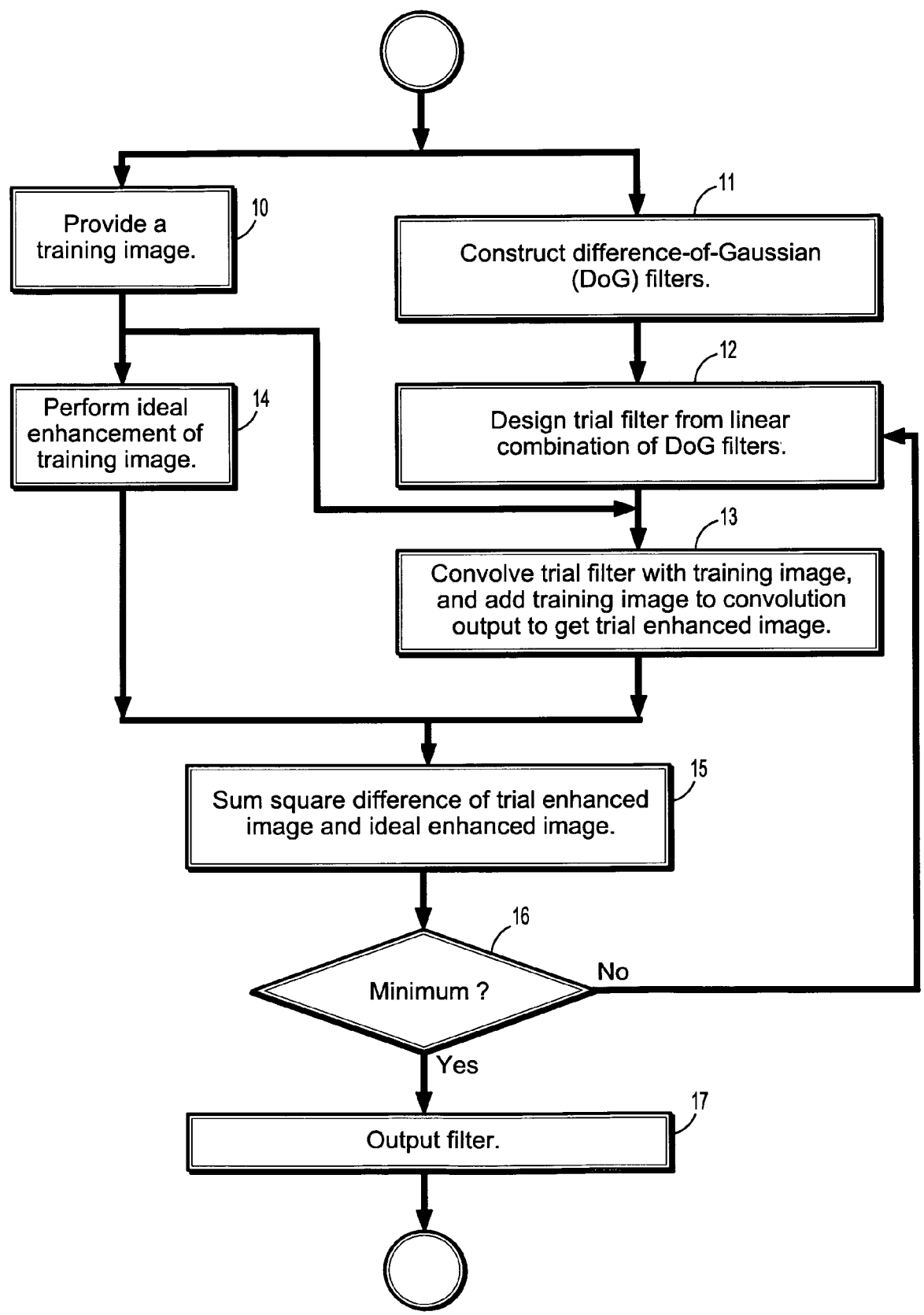
FIG. 1 depicts a flow chart of an exemplary filter design method according g to an embodiment of the invention.

Exemplary embodiments of the invention as described herein generally include systems and methods for designing separable filters whose outputs can approximate a target sequence of images. However, specific structural and functional details disclosed herein are merely representative for purposes of describing example embodiments of the present invention. Further embodiments of the invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Since Gaussian kernels are easy to implement and are well understood for their frequency responses, a filter design method according to an embodiment of the invention uses a difference of Gaussian (DoG) filters for partitioning the frequency plane. Each DoG filter can be interpreted as representing a particular frequency band. An allpass filter is used to preserve the direct current (DC) portion, i.e., the center or origin of the frequency space. By assigning different weightings to each DoG filter, one can emphasize different frequency bands proportional to the weightings. The final filter can be then obtained by a linear combination of all the DoG filters.

FIG. 1 is a flow chart illustrating how to design a (non-separable) filter which can generate results similar to target images or those processed by an ideal enhancement algorithm. Searching for the best weightings used in the linear combination of the DoG filters is an optimization problem. The weightings are iteratively updated until a minimum cost is reached. Let f(x) denote the input image, where in 2-D, pixel x=(x,y). Note that the description in terms of a 2-D example is for illustrative purposes only, and it will be apparent to those skilled in the art how to extend the following exemplary description to an arbitrary number of dimensions.

A filter design procedure according to an embodiment of the invention begins at step 11 with the construction of a set of difference of Gaussian (DoG) filters, with each of their frequency responses having certain frequency support. Let a(x) and $g_{94}(x)$ denote, respectively, the allpass and Gaussian filters. Note that the subscript of the Gaussian filter represents the standard deviation of the Gaussian function. The DoG filter set $h_i(x)$, i=1, . . . , L is computed according to $$h_1(x) = a(x) - g_{\sigma_1}(x),$$
$$h_2(x) = g_{\sigma_1}(x) - g_{\sigma_2}(x),$$
$$\vdots$$
$$h_L(x) = g_{\sigma_{L-1}}(x) - g_{\sigma_L}(x),$$

where L is the number of DoG filters one wishes to use in the design procedure.

Next, at step 12, a trial 2-D filter h(x) can be designed according to $$h(x) = \sum_{i=1}^{L} c_i h_i(x),$$

where $c_i$, i=1, ..., L are the weightings for the linear combination of the DoG filter set $h_i(x)$. Independently from the construction of the DoG filters, a training image f(x) is provided at step 10. At step 13, the training image is convolved with the set of trial DoG filters, and the training image is added to the convolution output to preserve the DC component of the image, to obtain a trial image:

$$f_t(x) = h(x) \circ f(x) + f(x),$$

where the symbol ○ denotes convolution. Note that if an allpass filter has been included in the above linear combination, this would be equivalent to adding the original training image back into the filtering output of step 13.

If there is no target image available, the training image can be enhanced by an ideal enhancement algorithm at step 14. According to an embodiment of the invention, a Laplacian pyramid (LP) procedure is used to create an ideal enhanced image $f_i(x)$. The LP procedure is exemplary and non-limiting, and any enhancement algorithm that is non-adaptive can be used for the ideal enhancement. Other possible algorithms include unsharp masking, tailored designed filter kernels that have particular frequency responses, and manually adjusted enhanced images. Note however, that the ideal enhancement is optional because it is not required if a target image is available.

At step 15, a square difference of the trial image $f_t(x)$ and the target/ideal enhanced image $f_i(x)$ is summed over all pixels x to calculate a cost function $$C = \sum_{\forall x} |f_t(x) - f_i(x)|^2,$$

and the resulting sum is tested to determine if a minimum value has been achieved at step 16. If the resulting value C is a minimum, the iterations can be terminated and the final filter is output at step 17. Otherwise, the iterations return to step 12, a new set of $c_i$ are selected, and the steps 13, 15, ands 16 are repeated.

By changing these weightings $c_i$, i=1, ..., L, one can find the optimal filter $h_o(x)$ that produces the filter output closest to that generated by LP enhancement in the least square sense. According to an embodiment of the invention, a simple local search strategy is used to determine the new $c_i$'s. Specifically, each $c_i$ is limited to a certain search range. This range is quantized to get many trial values for each $c_i$. Finally, all possible combinations of the $c_i$'s are used to find the one set that minimizes the cost function. It is common to use a large range and coarse quantization in the beginning, and then refine the range and quantization levels subsequently. Note that this method is exemplary and non-limiting, and any non-linear optimization method, such as simulated annealing and the simplex method, can be employed. These other methods would be utilized when the number of parameters (the $c_i$'s) to be optimized is large.

The Laplacian Pyramid used in step 14, according to an embodiment of the invention, is a decomposition of the original image into a hierarchy of images such that each level corresponds to a different band of image frequencies. The decomposition is performed by taking the difference of levels in the Gaussian pyramid, a hierarchy of low-pass filtered versions of the original image, such that successive levels correspond to lower frequencies. The low-pass filtering is done using convolution with a Gaussian filter kernel. Since the highest frequencies have been removed, the full-size image can be downsized without losing information. One can define a REDUCE operator which is a filtering followed by elimination of unnecessary pixels. An exemplary 2-D REDUCE operator for a filter kernel w(x,y) of dimension 5×5 and reduction factor 4 is:

$$\text{REDUCE}(f)(x, y) = \sum_{i=1}^{5} \sum_{j=1}^{5} w(i, j) f(2x + i, 2y + j).$$

There is a corresponding EXPAND operator which can reconstruct the low-pass filtered image by interpolating between pixels in the reduced image. A Gaussian pyramid is recursively defined on an image f by:

$$G_0 = f,$$

$$G_{i+1} = \text{REDUCE}(G_i).$$

Then, for an image f, the Laplacian pyramid L(f) is $L_i = G_i - \text{EXPAND}(G_{i+1})$.

The optimal filter $h_0(x)$ obtained from the above procedure is generally non-separable. Considering the final optimal filter $h_f(x) = h_0(x) + \delta(x)$, where $\delta(x)$ is the impulse (allpass filter), as a matrix, singular value decomposition (SVD) can be used to obtain the eigenvector v which corresponds to the largest eigenvalue of $h_f(x)$. The eigenvector v is the optimal separable filter that approximates $h_f(x)$ also in the least square sense. Normalizing v to the unit gain vector $\hat{v}$, one obtains a final separable filter.

Figure 2C:
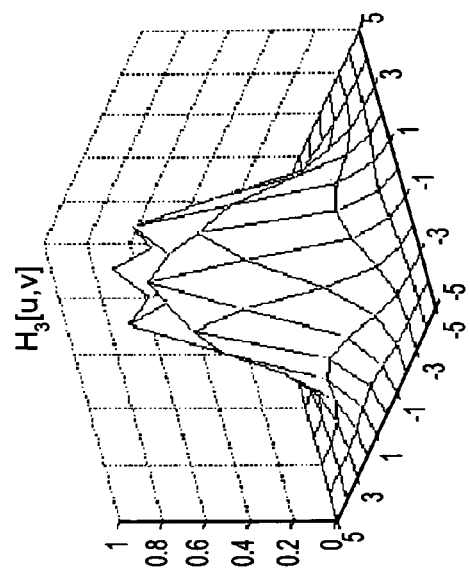
FIGS. 2(a)-(c) depict a set of three DoG filters used to design filter kernels for image enhancement through linear combinations, according to an embodiment of the invention.
Figure 2B:
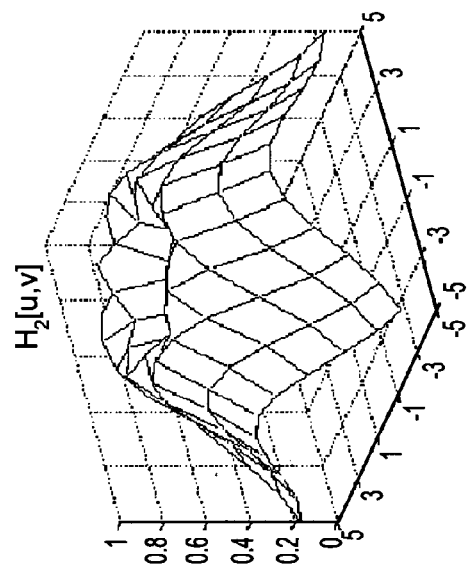
Figure 3:
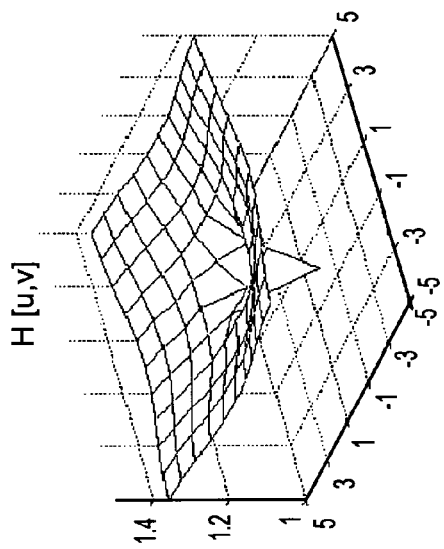
FIG. 3. illustrates an optimized filter through a linear combination of the DoG filters shown in FIGS. 2(a)-(c), according to an embodiment of the invention.
Figure 2A:
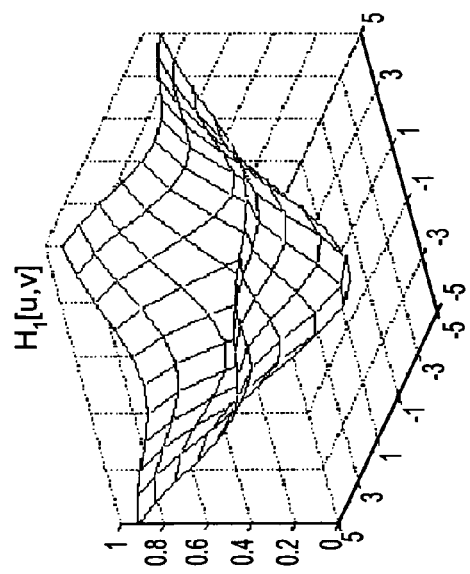

FIGS. 2(a)-(c) depict shows the magnitude responses of three DoG filters used to design filter kernels for image enhancement through linear combinations. Here, capital letters are used to denote the Fourier transform of the spatial domain image and u to index the Fourier space. FIG. 2(a) depicts a highpass filter $|H_1(u)|$, FIG. 2(b) depicts a bandpass filter $|H_2(u)|$, and FIG. 2(c) depicts another bandpass filter $|H_3(u)|$ emphasizing a different frequency band. Each of the three DoG filters used in the enhancement example has size each 11×11 pixels. FIGS. 4(a) and (b) depict an ultrasound image used for comparison between an enhanced target image, shown in FIG. 4(a), and the filtered output of a designed separable filter, shown in FIG. 4(b), according to an embodiment of the invention. The image in FIG. 4(a) is used to optimize the coefficients for linear combination of the DoG filters. FIG. 3. illustrates the magnitude response of a final optimized filter obtained through the addition of an allpass filter and the linear combination of the DoG filters $h_i(x)$, i=1, 2, 3, shown in FIGS. 2(a)-(c). It was optimized so that the enhanced result matches the target image shown in FIG. 4(a). It can be seen that this final filter $h_f(x)$ starts with gain 1 at DC; then the gain gradually increases as the frequency increases. This means that high frequency structures should be emphasized in the given image, as is often the goal for image enhancement. In the spatial domain, applying SVD to $h_f(x)$, one obtains the normalized eigenvector $\hat{v}$=[−0.00960, −0.01046, −0.01124, −0.01104,
    −0.02815, 1.14099, −0.02815, −0.01104,
    −0.01124, −0.01046, −0.00961], corresponding to the largest eigenvalue. Except for the DC, the high frequency bands have been emphasized with optimized weightings. Note that the same separable filter can be used for other images to yield similar enhanced outputs to other target images.

Figure 4B:
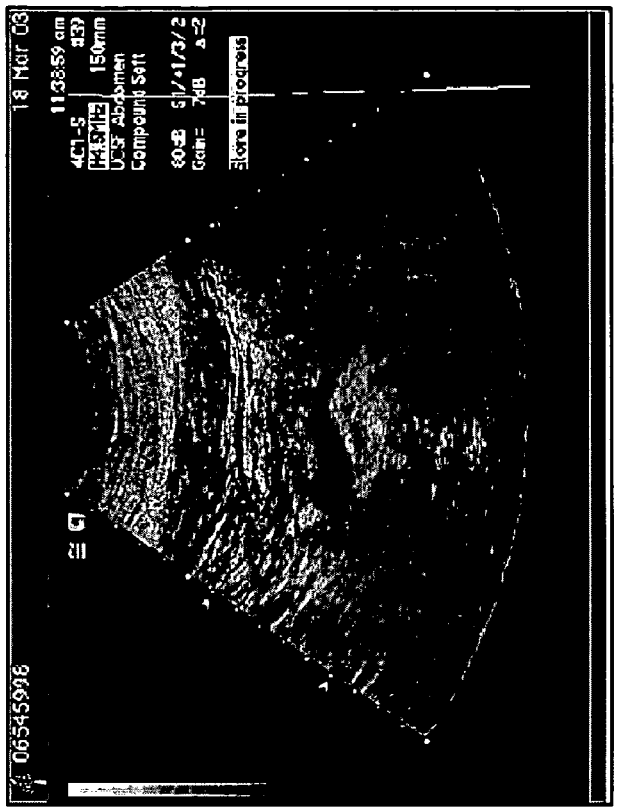
FIGS. 4(a)-(b) depict ultrasound images used for comparison between an enhanced target image and a filtered output of a designed separable filter according to an embodiment of the invention.
Figure 4A:
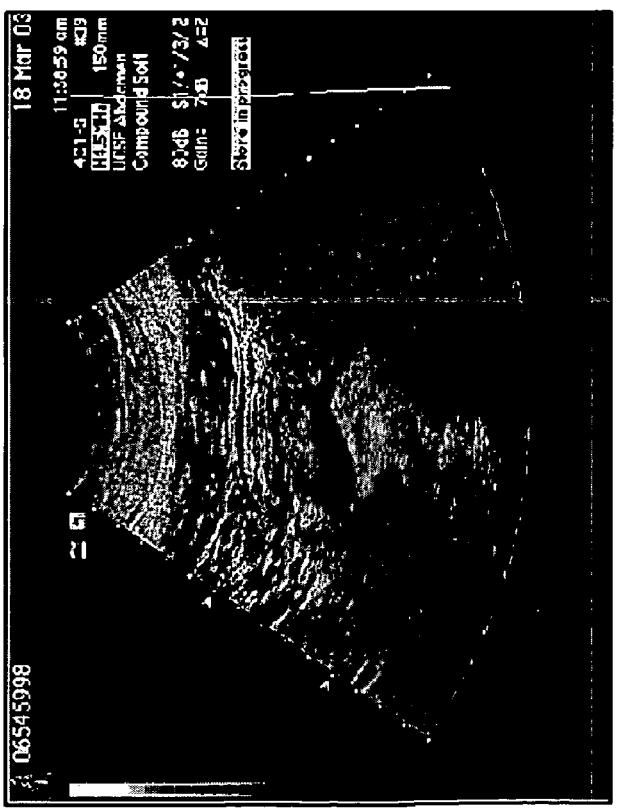

Using separable filter $\hat{v}$ according to an embodiment of the invention, the enhanced filtered output is shown along with the target image in FIGS. 4(b) and 4(a), respectively. Perceptually, these two images are very close to each other. The mean square error between these two images is 1.929, using 8-bit graylevel values that range from 0 to 255. Note that although h(x) is optimized based on the image shown in FIG. 4(a), the similarity in enhancement level between the outputs obtained from a separable filter $\hat{v}$ according to an embodiment of the invention and other target images carries over to other cases as well.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
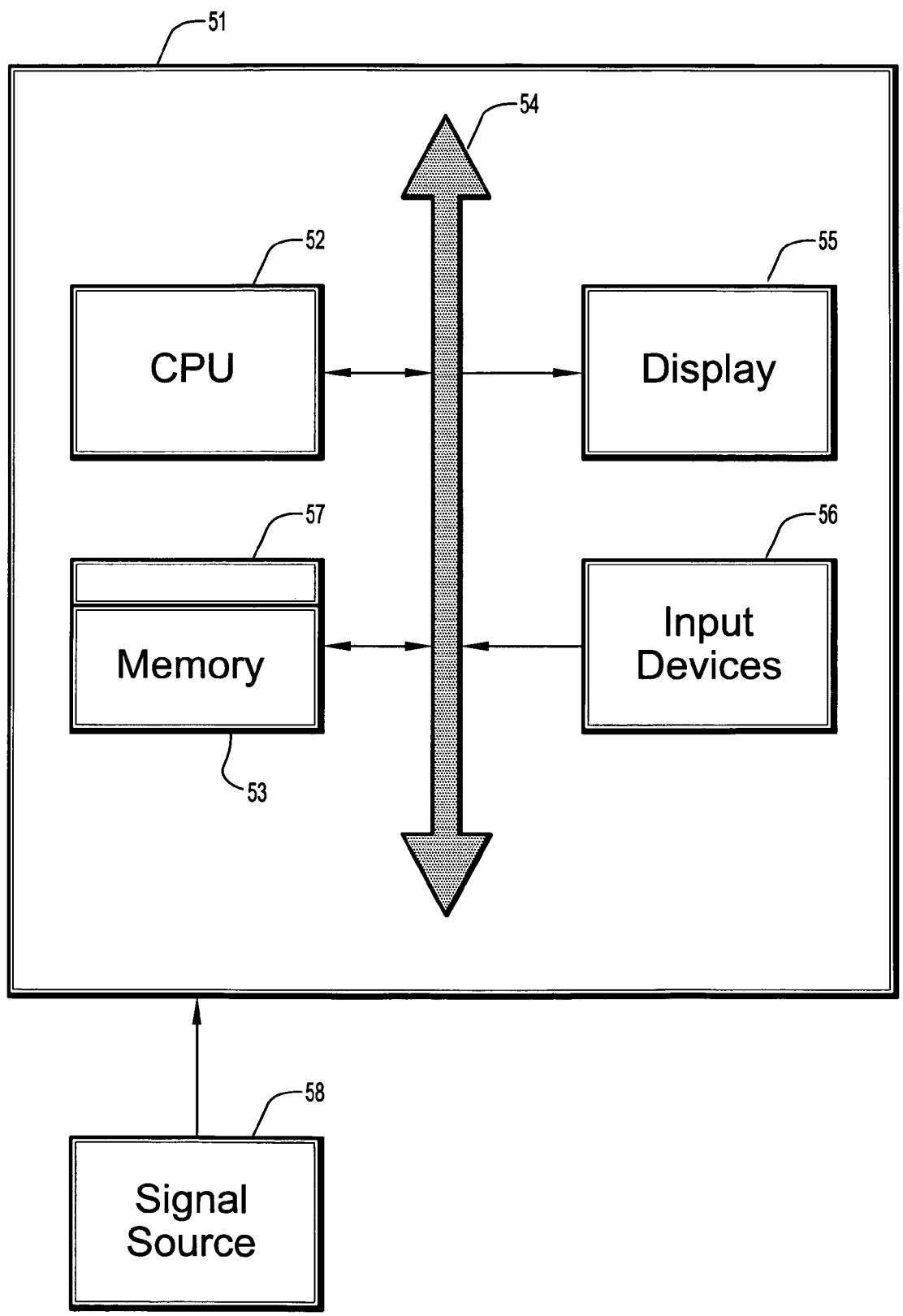
FIG. 5 is a block diagram of an exemplary computer system for implementing a method for feature estimation according to an embodiment of the invention.

FIG. 5 is a block diagram of an exemplary computer system for implementing a filter design method according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the data from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of designing filters for filtering digitized images comprising the steps of:
   using a processor to provide a digitized training image f(x) comprising a plurality of intensities corresponding to a domain of points on a n-dimensional grid;
   constructing a set of difference-of-Gaussian (DoG) filters {hi (x)} whose frequency responses partition a frequency space u;
   forming a linear combination of said DoG filters h(x)=Σci hi(x) to form a trial filter, said trial filter being associated with a set of linear combination coefficients {ci} that weight the contribution of each DoG filter to the trial filter;
   convolving said trial filter with said training image to obtain a trial image ft (x); and summing a square difference |fi (x)−fi (x)|² of said trial image and a target image fi (x) wherein if said sum is a minimum, outputting said trial filter as a final filter; and
   if said sum is not a minimum, forming a new linear combination of said DoG filters, and repeating the steps of convolving said trial filter with said training image, and summing a square difference of said trial image and said training image.

2. The method of claim 1, wherein said target image is obtained by ideally enhancing said training image.

3. The method of claim 2, wherein ideally enhancing said training image comprises using a Laplacian pyramid.

4. The method of claim 2, wherein said target image is another digitized image comprising a plurality of intensities corresponding to a domain of points on a n-dimensional grid.

5. The method of claim 1, wherein said trial filter includes an allpass filter.

6. The method of claim 1, wherein said training image is added to the convolution of said trial filter and said training image.

7. The method of claim 1, wherein constructing a set of difference-of-Gaussian (DoG) filters comprises the steps of constructing a set $\{G_{94_i}(x)\}$ of Gaussian filters of standard deviation $\sigma_i$ that are functions of frequency u, constructing an allpass filter a(x), constructing a first DoG filter according to $h_1(x)=a(x)-G_{94_1}(x)$, and constructing each subsequent DoG filter according to $h_i(x)=G_{94_{i-1}}(x)-G_{\sigma_i}(x)$, until a predetermined number of DoG filters have been constructed.

8. The method of claim 1, wherein the step of forming a linear combination of said DoG filters selecting a set of linear combination coefficients {ci} wherein each ci is limited to a predetermined range, quantizing said to obtain trial values for each ci, and
   selecting a combination of coefficients to define said linear combination of filters.

9. The method of claim 1, further comprises using a singular value decomposition on said final filter wherein an eigenvector corresponding to the largest eigenvalue of the final filter is obtained.

10. A computer storage readable medium, tangibly embodying a program of instructions executable by the computer to perform the method steps for designing filters for filtering digitized images, said method comprising the steps of:

providing a digitized training image f(x) comprising a plurality of intensities corresponding to a domain of points on a n-dimensional grid;

constructing a set of difference-of-Gaussian (DoG) filters {hi (x)} whose frequency responses partition a frequency space u;

forming a linear combination of said DoG filters h(x)=Σci hi(x) to form a trial filter, said trial filter being associated with a set of linear combination coefficients {ci} that weight the contribution of each DoG filter to the trial filter;

convolving said trial filter with said training image to obtain a trial image ft (x); and summing a square difference |fi (x)−fi (x)|$^2$ of said trial image and a target image fi (x) wherein if said sum is a minimum, outputting said trial filter as a final filter; and if said sum is not a minimum, forming a new linear combination of said DoG filters, and repeating the steps of convolving said trial filter with said training image, and summing a square difference of said trial image and said training image.

11. The computer readable program storage device of claim 10, wherein said target image is obtained by ideally enhancing said training image.

12. The computer readable program storage device of claim 11, wherein ideally enhancing said training image comprises using a Laplacian pyramid.

13. The computer readable program storage device of claim 11, wherein said target image is another digitized image comprising a plurality of intensities corresponding to a domain of points on a n-dimensional grid.

14. The computer readable program storage device of claim 10, wherein said trial filter includes an allpass filter.

15. The computer readable program storage device of claim 10, wherein said training image is added to the convolution of said trial filter and said training image.

16. The computer readable program storage device of claim 10, wherein constructing a set of difference-of-Gaussian (DoG) filters comprises the steps of constructing a set {$G_{\sigma_j}$(x)} of Gaussian filters of standard deviation $\sigma_j$ that are functions of frequency u, constructing an allpass filter a(x), constructing a first DoG filter according to $h_1(x)=a(x)-G_{\sigma_1}(x)$, and constructing each subsequent DoG filter according to $h_i(x)=G_{\sigma_{i-1}}(x)-G_{\sigma_i}(x)$, until a predetermined number of DoG filters have been constructed.

17. The computer readable program storage device of claim 10, wherein the step of forming a linear combination of said DoG filters selecting a set of linear combination coefficients {c,.} wherein each ci is limited to a predetermined range, quantizing said to obtain trial values for each c;, and selecting a combination of coefficients to define said linear combination of filters.

18. The computer readable program storage device of claim 10, the method further comprising using a singular value decomposition on said final filter wherein an eigenvector corresponding to the largest eigenvalue of the final filter is obtained.

* * * * *

UNITED STATES PATENT AND TRADEMARK OFFICE
CERTIFICATE OF CORRECTION

PATENT NO. : 7,593,598 B2 Page 1 of 1
APPLICATION NO. : 11/344480
DATED : September 22, 2009
INVENTOR(S) : Ti-chiun Chang and Jason Jenn-Kwei Tyan It is certified that error appears in the above-identified patent and that said Letters Patent is hereby corrected as shown below:

Title Page; item (60);
In the Related U.S. Application Data,
"Provisional application No. 60/649,412, filed on Feb. 2, 2005" should be corrected to read "Provisional application No. 60/649,742, filed on Feb. 3, 2005".

In Col. 1, lines 10-11, "U.S. Provisional application No. 60/649,412 of Chang, et al., filed Feb. 2, 2005" should be corrected to read "U.S. Provisional application No. 60/649,742 of Chang, et al., filed Feb. 3, 2005".

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,593,598 B2  Page 1 of 1
APPLICATION NO. : 11/344480
DATED : September 22, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 906 days.

Signed and Sealed this

Twenty-first Day of September, 2010

David J. Kappos
*Director of the United States Patent and Trademark Office*